W. W. NUGENT.
LUBRICATOR.
APPLICATION FILED MAR. 12, 1915.
1,212,387.
Patented Jan. 16, 1917.
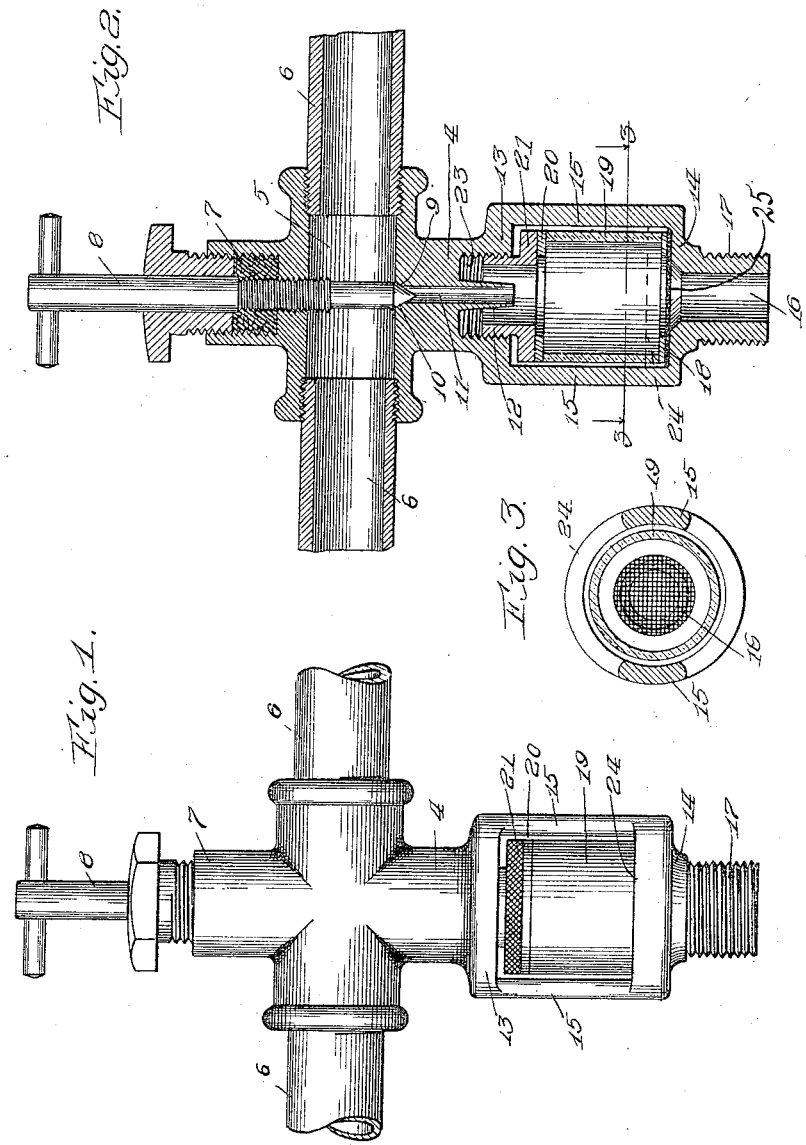
Witnesses:
R. L. Farrington
W. K. Olson
Inventor
William W. Nugent
By Brown, Nissen & Sprinkle
Attys.

UNITED STATES PATENT OFFICE.

WILLIAM W. NUGENT, OF CHICAGO, ILLINOIS.

LUBRICATOR.

1,212,387. Specification of Letters Patent. Patented Jan. 16, 1917.

Application filed March 12, 1915. Serial No. 13,939.

*To all whom it may concern:*

Be it known that I, WILLIAM W. NUGENT, a citizen of the United States, residing at Chicago, in the county of Cook and State of Illinois, have invented a new and useful Improvement in Lubricators, of which the following is a specification.

My invention relates to lubricators, and more particularly to lubricators of the sight-feed type.

One of the objects of my invention is the provision of simple and efficient means for permitting the lubricant to be viewed while being fed from a supply pipe, or other source of supply, to a surface to be lubricated.

A further object of the invention is the provision of means for permitting the transparent member of the sight-feed lubricator to be easily and quickly taken out to be cleaned, and easily and quickly put back securely in place.

Other objects of the invention will appear hereinafter, the novel features and combinations being set forth in the appended claims.

In the accompanying drawing,—Figure 1 is a side elevation of a lubricator embodying my invention; Fig. 2 is a vertical section of the same; and Fig. 3 is a horizontal plan section taken on the line 3—3 of Fig. 2.

Referring to the drawings, 4 designates a casing having a horizontal pipe passage 5 through its upper portion. This casing is provided with screw-threaded openings into which fit the ends of the supply pipes 6, 6. In the upper portion of the casing 4 is a stuffing box 7 for the valve stem 8, which is screw-threaded as shown and provided at its lower end with a valve 9 fitting against a valve seat 10, as shown in Fig. 2. Communicating with the horizontal pipe passage 5 is a vertical passage 11 of comparatively small diameter. The lower portion of the casing 4, by being hollowed out as shown in Fig. 2, makes provision for the screw threads 23, while the extension 12 lengthens the vertical passage 11. It should also be noted that the extension 12 is tapered on its outer surface, so as to form a comparatively thin edge at its lower end, which facilitates the formation of regularly recurring drops of oil or lubricant at the lower end of the passage 11 and thus forms an effectual nozzle. Connected to the lower end of the casing 4 is a substantially square or rectangular frame, having a square or rectangular opening therethrough. This frame comprises an upper cross-piece 13 and a lower cross-piece 14, connected by the diametrically disposed vertical bars 15. The lower cross-piece 14 is provided with a downwardly extending tube having a vertical pipe passage 16 therein in alinement with the vertical passage 11 above, and the outer portion of this tube being provided with screw threads 17 for connection directly or indirectly with the parts to be lubricated. The lower cross-piece 14 on its inner surface is preferably cup-shaped, to provide a circular seat for the sifting screen 25, which is preferably circular in shape. Above the screen 25 is placed a gasket of leather, cork or other suitable material. Resting on the gasket 18 is a tube 19, of glass or other transparent material, adapted to protect the lubricant dropping from the passage 11 into the opening 16, and permitting the rate of the dripping of such lubricant to be observed during its passage through the tube 19, so that the attendant may readily regulate the amount of opening between the valve 9 and the seat 10. Resting on top of the transparent tube 19 is another gasket 20, ring-shaped and similar to gasket 18. On the upper side of the gasket 20 is a ring 21, preferably of metal and having a central opening therethrough and a hub screw-threaded to fit the screw threads 23 of the recess in the casings 4, as shown in Fig. 2. Although the sifting screen 25, the gasket 18 and the tube 19 may be variously shaped in cross section, I prefer to make these parts circular in cross section.

The exterior cylindrical surface of the ring 21 is preferably knurled, as shown in Fig. 1, so as to enable it to be easily turned by means of a thumb and finger, to raise and lower the same off the gasket 20 or against it. By referring to Fig. 2, it will be seen that when the screen 25, the gasket 18 and the transparent tube 19 are in adjusted position, the flanges 24 prevent the tube 19 from being removed laterally; but when the ring 21 is moved upwardly against the cross-piece 13, the gasket 20 may be removed, after which the tube 19 may be lifted a sufficient distance to enable its being removed laterally over either flange 24 and entirely out of the frame, for the purpose of cleaning the interior surface of the transparent tube 19. This arrangement provides a simple means for easily and quickly removing the transparent tube in order to clean it, and it can be replaced with equal facility. Therefore, when the transparent tube requires cleaning, the continuous operation of the lubricant is interrupted for only a very short period because of the facility with which the transparent tube may be removed and replaced. During the cleaning of the tube 19, the valve 9 may be closed, and after the tube 19 is replaced it may be again opened to regulate the dripping of the lubricant from the extension 12 into the opening 16.

While I prefer to use the gaskets 18 and 20 so as to make substantially air-tight fits to confine the heat from the bearings within the transparent tube 19 and thereby maintain the interior surface of the transparent tube sufficiently transparent for a longer period of time, such gaskets, either one or both of them, may in some instances be omitted, while retaining the same transparent tube. This is for the reason that the ring 21 may be moved several times farther down below the cross-piece 13 than its position shown in Fig. 2. This adjustability of the ring 21 also permits tubes of different lengths being used, but I prefer to employ a length of tube slightly shorter than the distance between the upper edge of the flanges 24 and the lower surface of the ring 21 when the latter occupies its uppermost position. Furthermore, the sifting screen 25 may, in some instances, be omitted; but its presence will sift the lubricant of foreign matter before it reaches the parts to be lubricated. If there should be any tendency for the lubricant to accumulate around the seat of the sifting screen 25, the flanges 24 will prevent such accumulated lubricant from escaping over the cross-piece 14. It is also evident, from the construction illustrated in the drawings, that the supply pipes 6 may be connected to other sight-feed indicators, so that they may all be supplied with lubricant in parallel from a single source of supply.

Obviously, those skilled in the art may make various changes in the details and arrangement of parts without departing from the spirit and scope of my invention as defined by the claims hereto appended, and I wish, therefore, not to be restricted to the precise construction disclosed herein.

Having thus fully disclosed an embodiment of my invention, what I claim and desire to have protected by Letters Patent of the United States is:

1. A sight feed lubricator comprising a transparent tube, a clamping ring having a screw-threaded hub, and means for supporting said transparent tube having a screw-threaded recess for receiving said screw-threaded hub, said clamping ring having an exposed surface adjacent one end of said tube for manually turning said hub in said recess.

2. A sight feed lubricator comprising a frame having a rectangular opening therethrough and a screw-threaded recess therein, a transparent tube in the opening in said frame adapted for movement laterally of the frame out of said opening, and a clamping ring having a hub threaded in said screw-threaded recess to effect adjustment of said clamping ring.

3. A sight feed lubricator comprising a frame having an opening extending transversely therethrough; a transparent tube in the frame and formed of a length adapted to pass laterally through said opening; and a clamping ring having a threaded connection with the frame holding the transparent tube in the frame and adapted when adjusted away from the transparent tube to permit the removal of the latter from the frame laterally and independently thereof.

4. A sight feed lubricator comprising two spaced members; a transparent tube disposed between said members; the lower of said members having a flange extending upwardly around the transparent tube; and a clamping ring engaging the top of the transparent tube and having a threaded connection with one of the spaced members, the transparent tube being adapted to move laterally over the flange from between spaced members when the clamping ring is disengaged therefrom.

5. A sight feed lubricator comprising a frame having a vertical passage therethrough and a lateral opening intersecting the vertical passage; a transparent tube in said opening in substantial axial alinement with the vertical passage; and a clamping ring having a threaded connection with the frame and engaging the transparent tube locking the latter in said opening, said clamping ring being adapted to be adjusted on its threaded connection with the frame to disengage the transparent tube permitting the latter to be removed laterally through said lateral opening from the frame.

6. A sight feed lubricator comprising two spaced members with an opening therebetween; a transparent tube between the members of a length adapted to be readily removed laterally and individually from the space between the members; and a single clamping member adjustably mounted with respect to the spaced members, adapted to engage one extreme end of said transparent tube and lock the latter rigidly between the members.

7. A sight feed lubricator comprising two spaced members; a single individual transparent tube shorter than the space between said members and disposed between the latter; and a clamping member adjustably connected to one of the spaced members, engaging the transparent tube itself directly and rigidly holding the latter against the other of said spaced members, said transparent tube when disengaged by the clamping member, being adapted for movement laterally and individually from between said members.

8. A lubricator comprising a rectangular supporting frame having a cup at its lower end with a central opening therethrough and having an inner cylindrical screw-threaded recess in its upper portion, a knurled clamping ring screw-threaded into said recess, a nozzle extending through said recess into the opening of said clamping ring, a transparent tube in said cup, gaskets one at each end of said transparent tube, and a screen above the opening in said cup and below said transparent tube.

9. A lubricator comprising a frame having a lateral opening therethrough and having end openings therethrough, a single individual transparent tube in said lateral opening concentric with said end openings, a gasket at the extreme lower end of said tube, an additional gasket at the extreme upper end of said tube, and a clamping ring screw-threaded to said frame for adjustment to clamping position and to a position permitting removal of said transparent tube individually from said frame.

10. A sight-feed lubricator comprising a rectangular frame having a cup at its lower end with a central opening therein and having an inner cylindrical screw-threaded recess in its upper portion, a screen spanning the opening in said cup, a transparent tube resting in said cup, a gasket below said transparent tube, an additional gasket at the upper end of said transparent tube, a knurled clamping ring above the upper gasket, a hub on said ring screw-threaded into said cylindrical recess for adjusting said clamping ring into position for holding said transparent tube in said cup and for adjusting said clamping ring to a predetermined releasing position to permit said transparent tube to be removed from said cup for cleaning or renewal, and a drip nozzle extending into said cylindrical recess concentrically with said clamping ring, transparent tube and cup opening, said nozzle being connected to the source of lubricant supply.

11. A feed lubricator comprising two spaced members, a single tube disposed between said members and removable laterally from between the same, and a single clamping device for rigidly holding said tube between said members.

12. A feed lubricator comprising two fixed spaced members, a single tube disposed between said members, and a single device having an exposed surface always located between said members and manually operable for effecting the holding of said tube against one of said members and the release thereof.

13. A feed lubricator comprising two members, a single tube between said members, and a single clamping device having a screw-threaded connection with one of said members and an exposed surface in the space between said members for moving said clamp against said tube for locking the clamp securely against the tube.

14. A sight feed lubricator comprising a single transparent tube, means comprising two end members for supporting said tube, said tube being removable laterally from between said members, and a single clamping device for locking said tube rigidly between said members.

15. A lubricator comprising two members, a single tube located between said members for withdrawal laterally, and a single clamping device connected with one of said members and operable in the space between said members for positively forcing said tube against the other member and for locking it rigidly in such position.

16. A sight feed lubricator comprising a single transparent tube, two members one being provided with a seat for one end of said tube, a single clamping device having a screw-threaded connection with one of said members and an exposed surface operable approximately in the space between said members for operating the screw-threaded connection to secure positive seating of said tube.

17. A sight feed lubricator comprising a transparent tube, a cup seat for one end of said tube, a clamping ring engaging the other end of said tube, and a support having a screw-threaded connection with said clamping ring, said ring having means adjacent said tube for manually turning said ring on its screw-threaded connection to release said tube or clamp the latter in its cup seat.

18. A feed lubricator comprising two spaced members, a tube disposed between said members, and mechanism manually operable wholly in the space between said members for effecting the holding of said tube between said members and for releasing said tube.

19. A sight feed lubricator comprising two spaced members, a transparent tube disposed between said members, and a clamping ring having a threaded connection with one of said spaced members and engaging one end of said transparent tube, the transparent tube being removable laterally from its seat.

20. A sight feed lubricator comprising a support having a vertical passage therethrough and a lateral opening intersecting the vertical passage, a transparent tube in said lateral opening in substantial axial alinement with the vertical passage, a clamping ring having a threaded connection with the support and capable of locking the said tube in position, said clamping ring being adapted to be adjusted on its threaded connection with the frame to disengage the transparent tube permitting the latter to be removed laterally through said lateral opening from the support.

21. A sight feed lubricator comprising two spaced members, a single tube between the members of a length adapted to be readily removed laterally from the space between said members after slight movement, and a single clamping member adjustably mounted with respect to said spaced members and adapted to lock the said tube rigidly between said members.

22. A sight feed lubricator comprising two spaced members, of a single tube adapted to be located between said members and seated on one of the same, and a single ring clamping seat having a screw-threaded connection with the other member and an exposed surface between said members for manual adjustment to release said tube or lock the same rigidly in position between said members.

23. A sight feed lubricator comprising a single cup seat, a single transparent tube adapted to engage said seat, a single clamping ring seat for the other end of said tube having an exposed surface for manually turning adjacent the clamping seat, and a support for said clamping ring to permit the tube to be withdrawn laterally when released and to lock the tube in its cup seat and against its clamping seat when the clamping ring is tightened.

24. A sight feed lubricator comprising a single transparent tube, a single cup seat for one extreme end surface of said tube, a single ring seat for the other extreme end surface of said tube, and a support for said ring seat provided with a screw-threaded adjustment for said ring seat.

In testimony whereof I have signed my name to this specification in the presence of two subscribing witnesses on this 10th day of March, A. D. 1915.

WILLIAM W. NUGENT.

Witnesses:
CHAS. M. NISSEN,
ALLENA OFFUTT.

Copies of this patent may be obtained for five cents each, by addressing the "Commissioner of Patents, Washington, D. C."